United States Patent [19]

Guerendel et al.

[11] Patent Number: 4,874,060
[45] Date of Patent: Oct. 17, 1989

[54] DEVICE FOR RECEIVING SOUND WAVES IN A WELL

[75] Inventors: Philippe Guerendel, Paris; Charles Naville, Massy; Jean Laurent, Orgeval; Pascal Dedole, Rueil Malmaison, all of France

[73] Assignee: Institut Francais du Petrole & Compagnie Generale de Geophysique, Rueil-Malmaison, France

[21] Appl. No.: 46,644

[22] Filed: May 7, 1987

Related U.S. Application Data

[63] Continuation of Ser. No. 706,874, Feb. 28, 1985, abandoned.

[30] Foreign Application Priority Data

Feb. 28, 1984 [FR] France ................. 85 03197

[51] Int. Cl.[4] ............... G01V 1/00; G01V 1/40
[52] U.S. Cl. ................. 181/102; 181/401; 367/911
[58] Field of Search ........... 181/102, 103, 104, 105, 181/106, 107, 119, 122, 401; 367/13, 25, 26, 27, 28, 29, 30, 140, 142, 911, 912; 166/212; 324/347; 73/151

[56] References Cited

U.S. PATENT DOCUMENTS

| 2,846,662 | 8/1958 | Sparks | 367/86 |
|---|---|---|---|
| 3,208,549 | 9/1965 | Alexander et al. | 367/25 |
| 3,221,833 | 12/1965 | Malmberg | 181/106 |
| 3,353,622 | 11/1967 | Erickson | 181/106 |
| 3,354,983 | 11/1967 | Erickson et al. | 367/75 |
| 3,426,865 | 2/1969 | Henry | 181/104 |
| 3,454,870 | 7/1969 | Libelman et al. | 324/347 |
| 3,564,914 | 2/1971 | Desai et al. | 367/25 |
| 3,777,814 | 12/1973 | Gustavson et al. | 166/212 |
| 3,794,976 | 2/1974 | Michler | 367/75 |
| 3,811,529 | 5/1974 | Crawford | 181/104 |
| 3,883,841 | 5/1975 | Narl et al. | 367/912 |
| 3,949,352 | 4/1976 | Vogel | 367/140 |
| 4,242,744 | 12/1980 | Rottmar | 367/173 |
| 4,380,806 | 4/1983 | Waters et al. | 367/75 |
| 4,394,754 | 7/1983 | Waters | 367/75 |
| 4,631,963 | 12/1986 | Sprint et al. | 367/13 |
| 4,686,653 | 8/1987 | Storon et al. | 181/102 |

Primary Examiner—Brian S. Steinberger
Attorney, Agent, or Firm—Antonelli, Terry & Wands

[57] ABSTRACT

A sound wave receiving device associated with a probe lowered into a well at the end of a cable and applied against the wall of the well by opening anchorage arms. In the part of the probe in contact with the wall of the well there is disposed at least one receiver assembly comprising a sensor case connected by a resilient sheath and a sleeve, movable along a cylinder integral with the body, to the rod of a piston sliding in said cylinder. A hydraulic and/or pneumatic system is provided for placing the case in contact with the wall and increasing the force of application of said case.

18 Claims, 6 Drawing Sheets

DEVICE FOR RECEIVING SOUND WAVES IN A WELL

This is a continuation of application Ser. No. 706,874, filed February 28, 1985 now abandoned.

BACKGROUND OF THE INVENTION

1. Field of the Invention

The invention relates to a device for receiving sound waves in wells or drill holes, adapted more particularly for seismic prospection.

2. Description of the Prior Art

The sound wave receiving devices used in wells are generally included in a probe formed from an elongate body having retractable anchorage means associated with drive means.

The anchorage means may be formed from pivoting arms and/or anchorage shoes brought into contact with the wall by means of actuating cylinders associated with hydraulic pressure means controlled from the surface. In a first embodiment, the anchorage means are disposed on the same side of the body of the probe. When they are actuated, the body of the probe is offset laterally and comes into contact with the wall of the well. In the contact zone of the body, in a compartment thereof, are disposed an assembly of sensors. Such a probe is described for example in French Pat. No. 2 501 380.

In another known embodiment, the probe comprises transducers movable with respect to the body of the probe. The transducers are for example rigidly fixed to the rod of hydraulic cylinders and may thus be moved from a retracted position to a coupling position with the wall of the well. Such a probe is described for example in U.S. Pat. No. 3 354 983.

In all cases, the sensors or transducers are fixed or coupled directly to the body of the probe, so that the characteristics of this latter as well as its method of coupling to the earth influence the results of the measurements. The mass of the body of the probe is generally fairly high. It is all the more so since anchorage arms or cylinders and jack means are used proportioned for generating high bearing forces against the wall of the well so as to improve the coupling coefficient of the probe.

Considering the direct couplings generally existing between the sensors and the body of the probe, the mass of this latter influences directly the resonance frequency of said sensors. It can be shown and proved in fact experimentally that the resonance frequency of the sensors increases when the total mass of the body and of the sensors decreases and when the coupling between the probe and the wall of the well is stiffer and also that the frequency response of the sensors improves when the total mass decreases.

The rigid connection of the sensors to the body of the probe also has the drawback that the surface waves which are transmitted by the fluid generally filling the well are detected by said sensors and mask the useful incoming seismic waves.

Furthermore, in the case where the contact between the sensors and the wall of the well is obtained by offc-entering the probe, the frequency response of the sensors is modified. It is different depending on whether they are disposed in the plane of symmetry of the offc-entered probe or perpendicular to this plane:

SUMMARY OF THE INVENTION

The receiving device of the invention avoids the above mentioned disadvantages. It is adapted to be associated with a probe lowered into a well or drill hole, at the end of a cable and able to be applied against the wall of the well by opening out anchoring arms, and comprises at least a receiver assembly and a hydraulic cylinder associated with pressure means for moving each receiver assembly between a retracted position and a position in which it is coupled with the wall of the well.

The device is characterized in that each receiver assembly is connected to the probe through resilient suspension means.

In a first embodiment of the device, the body of the cylinder is integral with the probe, at one end and the piston of the cylinder is connected to the receiving assembly through a sleeve adapted to slide over the body of the cylinder and a resilient suspension element comprising a tubular sheath having a section greater than that of the sleeve which defines with this latter and with the receiver assembly an annular chamber and the pressure means comprise a hydraulic system for operating the cylinder.

In a second embodiment, the sensor is integral with the piston of the cylinder, the body of this latter being connected to the probe by means of deformable connection elements.

In both cases, the interposed resilient connection elements considerably reduce the influence of the mass of the body of the probe on the frequency response curve of the sensor and the transmission to this latter of the parasitic vibrations.

BRIEF DESCRIPTION OF THE DRAWINGS

Other features and advantages of the device of the invention will be clear from reading the following description of several embodiments chosen by way of non limitative examples, with reference to the accompanying drawings in which.

DESCRIPTION OF THE PREFERRED EMBODIMENTS

Figure 1:
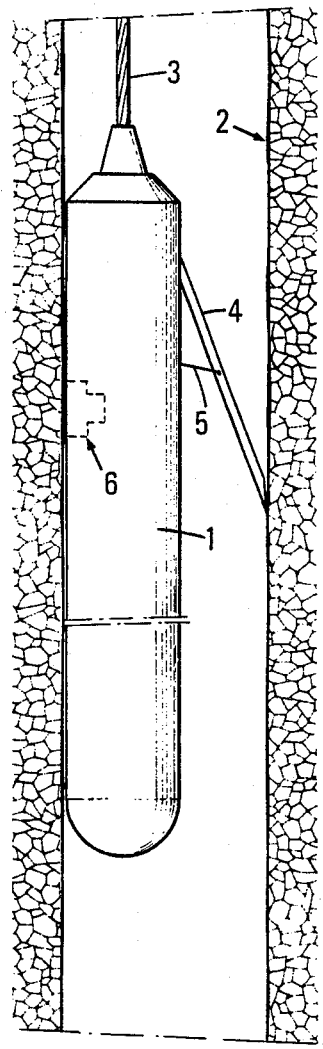
FIG. 1 shows schematically a probe body applied against the wall of the well by opening out an anchoring arm.

The probe shown in FIG. 1 comprises a tubular body 1 lowered from the surface inside a well or drill hole 2, at the end of a multifunction cable 3 adapted for supporting the probe and containing electric supply wires and conductors for transmitting both the control signals to different apparatus contained in the body of the probe and the data produced by these latter towards a surface installation. The probe is provided with at least one anchorage arm 4 adapted for pivoting at one of its ends with respect to the body, this arm being able to be moved out by moving the rod 5 of a hydraulic jack by means of a hydraulic system of a known type and not shown.

The hydraulic system may comprise for example an electric motor adapted, by means of an endless screw, for moving a piston in translation inside a cylinder filled with oil and a hydraulic circuit associated with static pressure balancing means and means for limiting possible over pressures, so as to cause the chambers of the cylinder, on each side of the piston, to communicate with the opposite ends of the jack actuating the anchorage arm. Such a system is described for example in detail in French Pat. No. 2 501 380.

By moving aside, the arm comes to bear against the wall of the well and moves the body until it comes into contact with the opposite wall.

Figure 2:
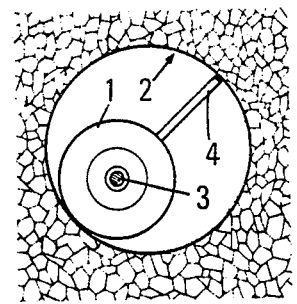
FIG. 2 shows schematically a top view of a probe body having a single anchorage arm.
Figure 3:
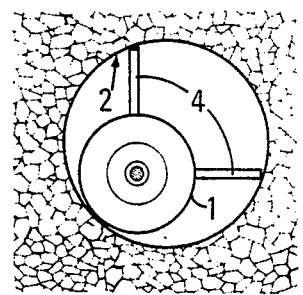
FIG. 3 shows schematically a probe body off-centered by opening two anchorage arms.

The probe may comprise one or more hydraulic jacks disposed along the same generatrix of the body (FIG. 2) or else at least one pair of arms 4 which may pivot in two different planes (FIG. 3) and which, by coming to bear against the wall of the well, push the body 1 back towards the contact zone situated substantially in the mid-perpendicular plane.

In the zone of contact with the wall of the well, body 1 comprises at least one cavity 6 for a reception assembly R.

Figure 4:
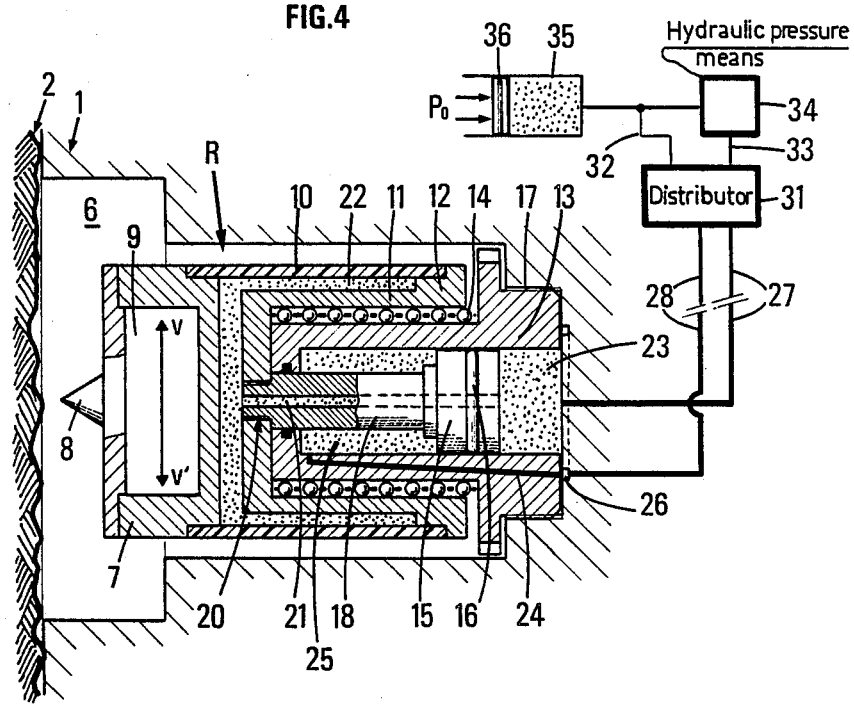
FIG. 4 shows a schematical cross sectional view of a first embodiment of a reception assembly, the sensor being in a retracted position.
Figure 5:
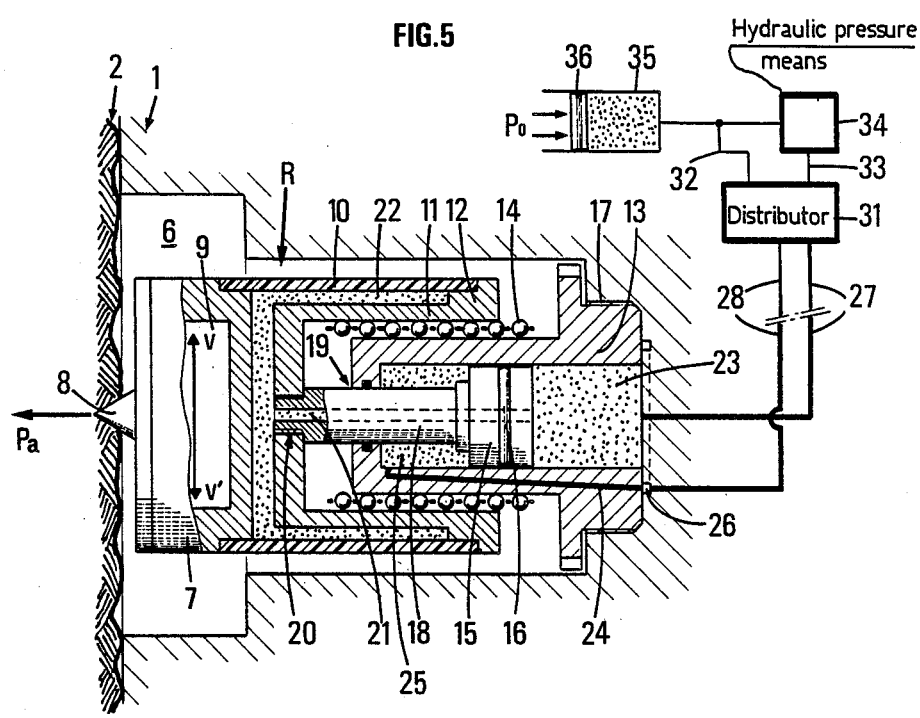
FIG. 5 shows the reception assembly of FIG. 4, the sensor being in the coupling position with the wall.
Figure 6:
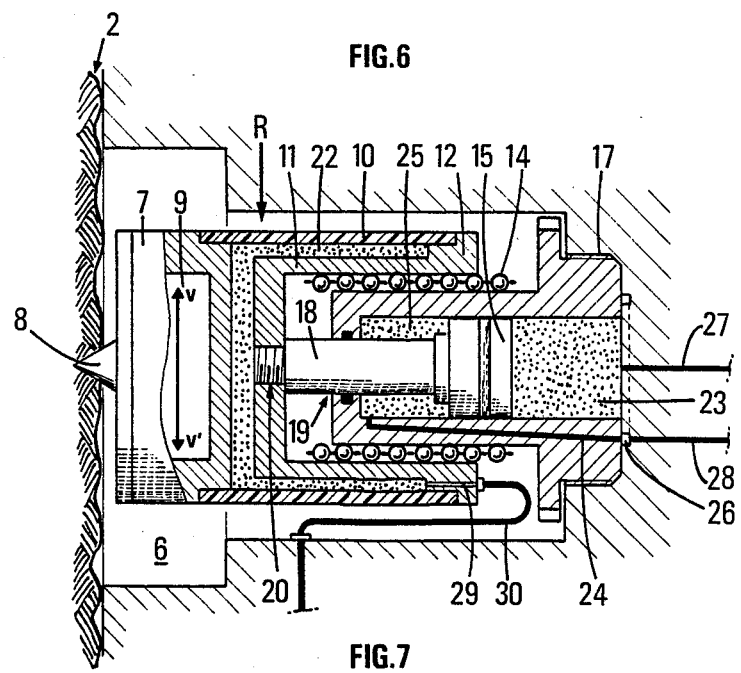
FIG. 6 shows a schematical cross sectional view of a variant of the embodiment shown in FIG. 5.

In the embodiment shown in FIGS. 4 to 6, each reception assembly R comprises a case 7 having one face in contact against the wall of the well. This face may have a point 8 for improving the coupling. Inside case 7 is disposed a seismic sensor 9. Case 7 is fixed to a first end of a sheath 10 made from a resilient material such as an elastomer or a composite fiber-based material. A rigid sleeve 11, of a section less than that of the sheath, is disposed coaxially inside this latter.

Sleeve 11 is closed at its end the closest to case 7 and open at its opposite end. On its open end side it has, towards the outside, a shoulder 12 over which the end of sheath 10 is fitted. A cylinder 13, having a section less than that of sleeve 11 is disposed inside this latter.

A reduced friction guide means, such as a ball bearing 14 for example, may be disposed between sleeve 11 and cylinder 13 for facilitating the relative translational movement of one with respect to the other. Cylinder 13 has an inner bore in which a piston 15 can slide. The two parts of the bore, on each side of piston 15, are isolated from each other by a seal 16 disposed on the periphery thereof. Cylinder 13 is closed at its end the closest to the bottom of sleeve 11 and open at its opposite end. This latter is provided with a threaded portion adapted for screwing into a housing 17 formed in the bottom of the cavity 6 of the body of the probe. Piston 15 has a rod 18 threaded at its end and the end wall at the bottom of cylinder 13 is provided with an opening 19 whose section matches that of the rod. The end of rod 18 is adapted so as to be screwed into a housing 20 formed at the bottom of sleeve 11.

The space between the inner diameter of sheath 10 and the outer diameter of sleeve 11 form an annular chamber 22 near the closed end of case 7.

Piston 15 separates the cylinder 13 into two opposite chambers 23 and 25. Chamber 23 which will be designated hereafter thrust chamber is situated on the open end side of cylinder 13. Chamber 25, which will be designated recoil chamber, is situated on the closed end side of the cylinder. A channel 24 is formed in the side wall of the cylinder. At a first end, it opens into the recoil chamber 25.

At its opposite end, channel 24 opens, when cylinder 13 is screwed into its housing 17, into a groove 26 formed in the side wall thereof. Two channels 27, 28 open respectively into the bottom of housing 17 and into groove 26 and place the two opposite chambers 23 and 25 of the jack formed by cylinder 13 and piston 15 in communication with a hydraulic system.

This system comprises for example a four-way distributor 31 of known type. Two of the ways are connected to ducts 27, 28. The other two ways are connected to two ducts 32, 33 which are connected respectively to the inlet and to the outlet of hydraulic pressure means of a known type 34. The pressure at the inlet of pressure means 34 is kept equal to the static pressure reigning in the well by means of a pressure balancing cylinder 35 in which freely slides a piston 36.

On one of the faces of piston 36 is applied the pressure reigning outside body 1. On its opposite face is applied the pressure reigning in duct 32.

A hydraulic system which may be used for operating the jack of each reception assembly is described in French Pat. No. 2 501 380 mentioned above.

In the embodiment shown in FIG. 4, an axial channel 21 passes right through piston 15 and its rod 18 and places the annular chamber 22, defined by sheath 10 and sleeve 11, and the thrust chamber 23 in communication.

In the variant shown in FIG. 6, the annular chamber 22 does not communicate with the thrust chamber. It is connected by a channel 29 passing through shoulder 12 and an external duct 30 with means not shown for applying to said chamber a fluid at a pressure at least equal to the static pressure reigning in the well at the depth of use of the probe. If the external static pressure is very high, the fluid used is a liquid. In this case, duct 30 is placed in communication with the hydraulic system so that a pressure at least equal to the external static pressure is applied inside the annular chamber. When the depth of use of the probe is relatively small, the fluid supplying the annular chamber 22 may be compressed air. One embodiment of a pneumatic system adapted for supplying air at the required pressure will be described later on with reference to FIG. 13. At certain depths of use of the probe, the annular chamber 22 may be supplied with a gas and liquid mixture.

The embodiment of FIGS. 4 and 5 and the variant of FIG. 6 operate as follows:

With the probe lowered to the chosen depth and applied against the wall of the well by opening out the anchorage arm or arms (FIGS. 2, 3) and with the reception assembly in the retracted position shown in FIG. 4, the electromagnetically operated valve 31 is positioned so as to place ducts 27, 28 respectively in communication with ducts 33, 32 so that the high pressure available at the outlet of the pressure means 34 is applied on the thrust chamber 23 side. The assembly of piston 15, cylinder 13, sheath 10 and case 7 then moves towards the outside of body 1 until it comes into contact with the wall of the well (FIG. 5).

The coupling force Pa effectively applied to case 7 depends on the axial coefficient of elasticity of sheath 10 which transmits, while being deformed, the hydraulic thrust applied in chamber 23.

In the embodiment shown in FIGS. 4, 5, the hydraulic over-pressure in the thrust chamber 23 is transmitted to the annular chamber 22 through channel 21 of the rod of the piston. Application of this over-pressure to case 7 contributes to increasing the application force generated principally by the cylinder.

In the variant shown in FIG. 6, a pressure slightly greater than the external static pressure is preferably applied in the annular chamber 22 through duct 30, so as to stretch sheath 10 and increase the effective force with which the case is applied against the wall of the well.

In both cases, retraction of the case inside cavity 6 is achieved by placing ducts 27, 28 respectively in communication, by means of the electromagnetically operated valve 31 with ducts 32, 33 so that the high pressure at the outlets of the hydraulic pressure means 34 is transmitted to the recoil chamber 25.

Orientation of sensor 9 inside its case 7 depends on the fluid used in the annular chamber 22.

If the thrust chamber 23 and the annular chamber 22 communicate with each other through channel 21 (FIGS. 4, 5) or if the fluid used in the annular chamber 22 is a liquid, sensor 9 is disposed so that its main direction of oscillation V V' is in the plane orthogonal to the direction of the anchorage force against the wall of the well. Thus, the sensor detects substantially only the vibrations which are applied directly thereto, through the wall of the well. The fact of fixing case 7 in cantilever fashion at the end of the elastic sheath 10 means that the mass of the probe does not affect the frequency at which the sensor 9 resonates when it is coupled to the wall and the parasite vibrations of the body of the probe are only transmitted very weakly to the sensor.

When the thrust chamber 23 is isolated from the annular chamber 22 (FIG. 6) and if the conditions of use of the probe allow a gas to be used for establishing the required overpressure, the sensor may possibly be orientated inside case 7 so that its main direction of oscillation V V' is parallel to the direction of the force of application against the wall of the well. In this case, the resilience of the resilient sheath and the elasticity of the gas serve concurrently for eliminating the parasitic vibrations which may be transmitted through the body of the probe.

Figure 7:
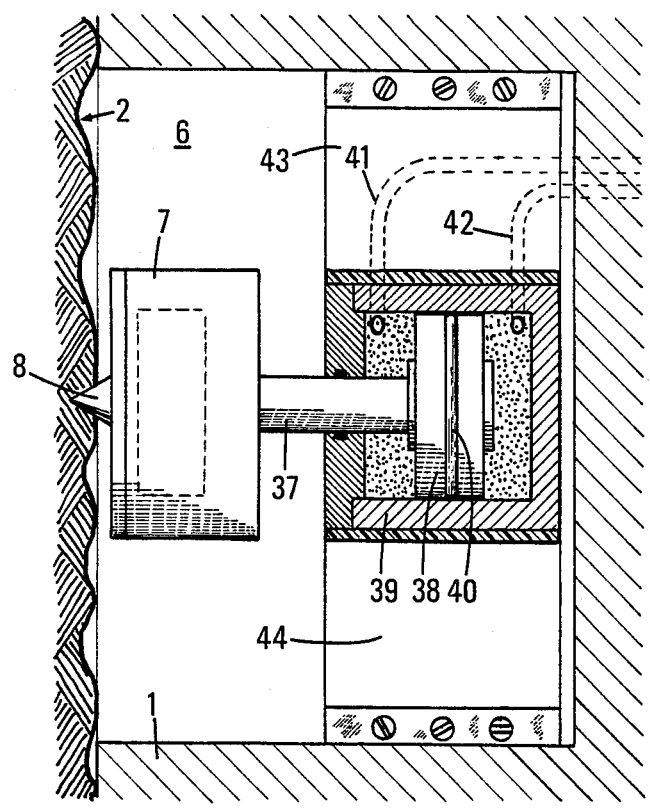
FIG. 7 shows, also in cross section, a second embodiment of a reception assembly.
Figure 9:
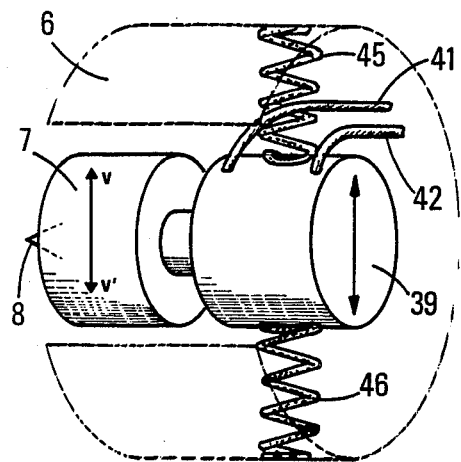
FIG. 9 shows schematically a variant of the embodiment of FIGS. 7 and 8.
Figure 8:
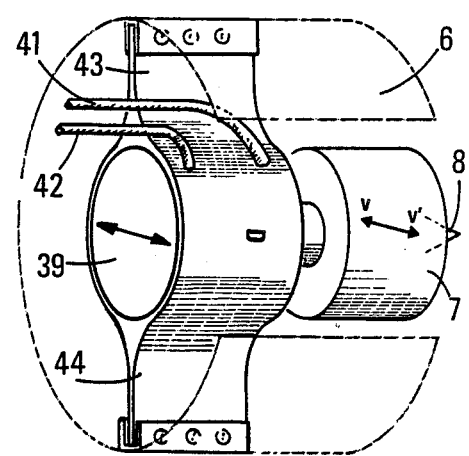
FIG. 8 shows schematically in perspective the reception assembly of FIG. 7.

In the second embodiment shown in FIGS. 7 to 9, case 7 is fixed to the rod 37 of a jack comprising a piston 38 integral with the rod, a cylinder 39 having an inner section matching the section of the piston, a seal 40 for isolating the parts of the cylinder one from the other on each side of the piston and a hydraulic system similar to the one used for the embodiment shown in FIGS. 4 to 6 (not shown), which communicates with the two end parts of said cylinder by means of two flexible ducts 41, 42.

In this embodiment, it is the assembly of case 7 and the associated jack which is connected to the body of probe 1 by resilient means.

These means comprise for example (FIGS. 7, 8) two thin elastomer plates 43, 44 fixed to the cylinder along diametrically opposed generatrices on the one hand and to the wall of cavity 6 on the other, so that they are both in a vertical plane.

The resilient suspension means may also comprise (FIG. 9) two helical springs (45, 46) fixed on the one hand, to the two diametrically opposite faces of cylinder 39 and on the other to the wall of cavity 6, so that their axes of oscillation are aligned along the vertical.

The coupling of case 7 against the wall of the well and retraction thereof are provided, as for the preceding embodiment, by applying with the hydraulic system a differential pressure alternately on one side and on the other of the piston 38 of the cylinder.

The embodiment shown in FIGS. 7, 8 is used for applications in which the direction of oscillation V V' of the sensor is perpendicular to the vertical plane containing the elastomer plates 43, 44. The dimensions of these plates are chosen so that they are very stiff in the vertical plane and less stiff in the direction of oscillation of a sensor. Thus, the force with which the case is applied against the wall of the well is substantially equal to the thrust of the jack but the parasitic vibrations to which the body of the probe may be subjected in the direction of oscillation V V' of the sensor are practically not transmitted to this latter.

The variant of FIG. 9 is particularly suitable for applications in which the direction of oscillation V V' of the sensor is vertical, the flexibility of the springs serving for damping the parasite vertical vibrations which might be transmitted thereto through the body.

A composite material may also be used having an orientated structure whose modulus of elasticity is anisotropic, such for example as a fibrous material. Such a material has high elasticity in the plane transversal to the fibers and high rigidity in the stretching direction of the fibers. Plates 43, 44 in the embodiment of FIGS. 7, 8 are cut from such a material and are orientated so that the fibers are parallel to the axis of the cylinder. The helical springs of the variant of FIG. 9 may also be replaced by plates cut so that their rigidity is low in the vertical direction and high in the horizontal plane.

Figure 10:
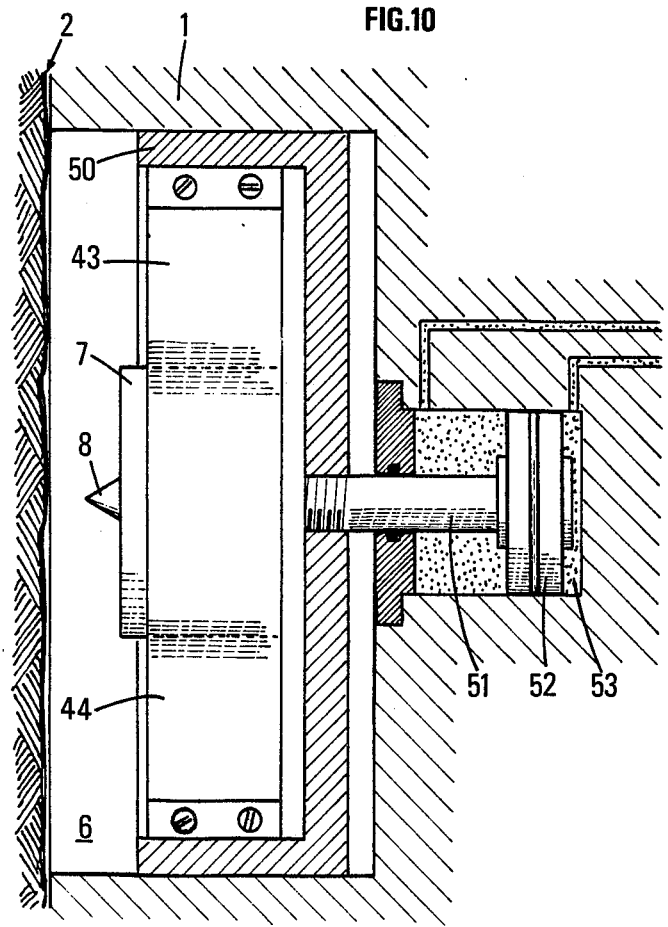
FIG. 10 shows schematically a cross sectional view of a third embodiment of a reception assembly.

In the embodiment of FIG. 10, case 7 is connected directly to the resilient means formed from two plates 43, 44 also made from elastomer or a composite material. The plates are fixed to case 7 along two diametrically opposite generatrices thereof, on the one hand, and on the other to two opposite faces of a rigid member 50 having a section matching the section of the cavity 6 of the body and movable therein. Member 50 is integral with a rod 51 fixed to a piston 52 adapted for sliding in a cylinder 53 disposed radially in the probe body 1, under the action of a hydraulic system similar to the one used for the embodiment of FIGS. 4 to 6.

The case is driven by the movement of the piston and through the rigid member 50, from a retracted position to a position anchored against the wall of the well. Similarly, the sensor is orientated in its case 7, so that its axis of oscillation is substantially parallel to the direction in which the plates have the highest elasticity.

This method of suspension is advantageous to the extent that the actuating jack 51, 52 is here supported by the probe body and the mass suspended from the resilient means is reduced to that of case 7.

The probe may comprise a single sensor assembly chosen from the above described assemblies or several in combination, orientated in a preferential direction.

A preferred arrangement consists in disposing several of said assemblies in appropriate housings in probe 1, so that the sensors which they contain are orientated in different directions.

Figure 11:
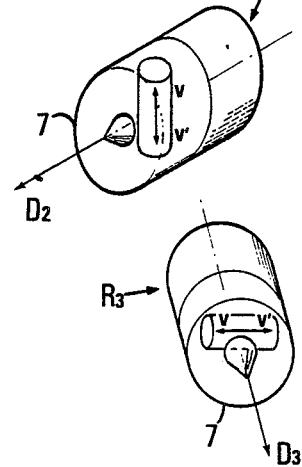
FIG. 11 shows the arrangement and orientation in space of three reception assemblies which may be advantageously disposed in the same probe body.

In FIG. 11, three of the preceding reception assemblies are orientated respectively in three directions parallel to three axes OXYT of a horizontal plane, the axes OX and OY being perpendicular and axis OT being the bisectrix of the angle XOY. The axis of movement of the case of the first assembly R1 of the three reception assemblies is directed in a direction D1 parallel to OX and the axis of oscillation V V' of the sensor is orientated in a direction parallel to axis OY. A second assembly R2 is disposed at a different level of the body of the probe and the axis of movement of the corresponding case 7 is directed in a direction D2 parallel to OT. The axis of oscillation V V' of the sensor which is contained therein is directed along the direction parallel to OZ. The third assembly R2 is disposed for example at a level lower than that of the second. The axis of movement of case 7 is orientated along a direction D3 parallel to OY and the axis of oscillation V V' of the sensor is chosen parallel to OX.

Figure 12:
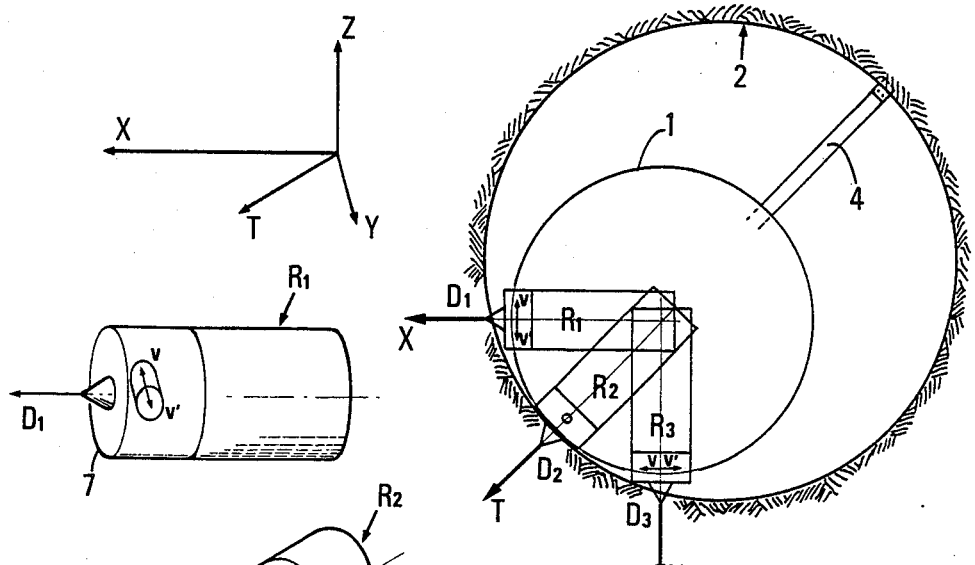
FIG. 12 shows an arrangement of three reception assemblies with respect to the body of a probe in a case where this latter has a single anchorage arm.
Figure 13:
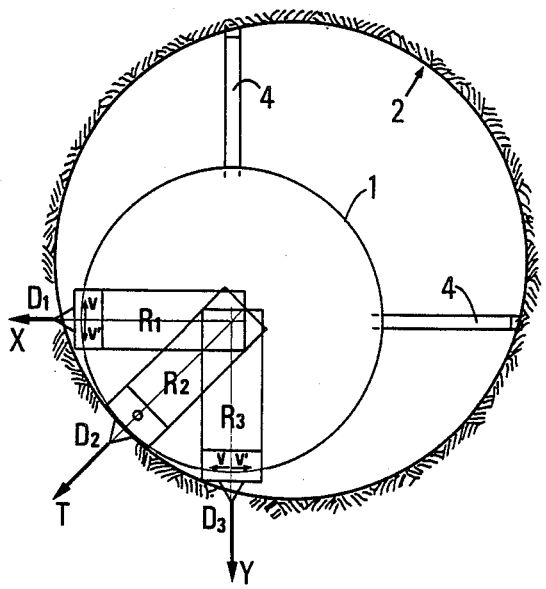
FIG. 13 shows a similar arrangement of three reception assemblies in the body of the probe, in the case where this latter has two anchorage arms whose respective pivoting planes are orthogonal.

The three reception assemblies R1, R2 R3 are disposed, with respect to body 1 of the probe, so that by actuation of their cylinders the respective application faces of the three cases 7 containing the sensors come into contact with the wall of the well (FIGS. 12, 13). The stroke of the cylinders is also chosen so that contact takes place, even for wells having a diameter much greater than that of the probe. To improve the coupling, the application face of the cases is given a rounded shape.

In the arrangement shown in FIG. 12, the direction OT along which the receiver assembly R2 is aligned is in the opening plane of the anchorage arm 4. In the arrangement shown in FIG. 13, the directions OX and OY along which the receiver assemblies R1 and R3 are aligned are in the orthogonal opening planes of two anchorage arms 4.

Figure 14:
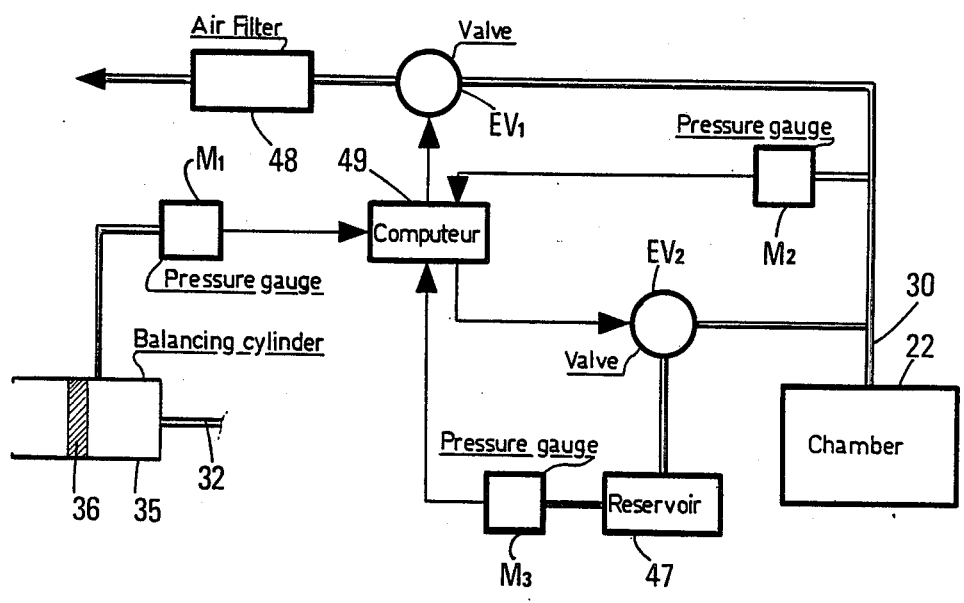
FIG. 14 shows the block diagram of a pneumatic system which may be used for improving the coupling of the sensors against the wall of the well, in the embodiment shown in FIG. 6.

The pneumatic system for bringing the annular chamber 22 of the receiver assembly of FIG. 6 to a pressure slightly greater than the pressure reigning in the well at the depth of use, comprises, for example (FIG. 14) a compressed air reservoir 47, whose pressure has been brought, before lowering of the probe into the well, to a pressure very much higher than the maximum static pressure which it is possible to observe under normal conditions of use. This reservoir is connected through a two way electromagnetic valve EV2.

Duct 30 is also connected to a pressure gauge N2 and, through a two-way electromagnetic valve EV1, to an air filter 48 facilitating the expulsion of air outside the probe. The pressure inside reservoir 47 is measured by a pressure gauge M3. The static pressure reigning in the well is measured by connecting the static pressure balancing cylinder 35 (FIG. 6) to a pressure gauge M1. The electric voltages generated by the pressure gauges M1, M2, M3 in response to the pressures which they measure are applied to a computer 49 of a known type adapted for generating signals for controlling the electromagnetically controlled valves EV1, EV2, depending on the pressure reigning in chamber 2 and duct 30.

If the pressure inside chamber 32 of each receiver assembly R drops below the external static pressure, because the depth of use of the probe increases, computer 49 controls the opening of the electromagnetically controlled valve EV2 so as to reestablish a slight over pressure. If this over pressure increases too much, because the probe rises, the computer 49 controls the opening of electromagnetically controlled valve EV1 so that the excess air is discharged outside chamber 22.

When the pressure in reservoir 47 drops because the air which it contains has gradually been used for reestablishing the over pressure required in the annular chamber 22 of the receiver assemblies, and drops below a preestablished threshold, computer 49 generates an alarm signal. The probe is then raised and the reservoir 47 recharged.

What is claimed is:

1. A sound wave reception device to be positioned in a probe lowered into a borehole at an end of a cable, said probe having a cavity and being provided with at least one anchoring movable arm, opening of said at least one arm pushing the probe towards a wall of the borehole, said device comprising at least one directional receiver assembly displaceable in said probe cavity and an actuating jack associated with pressure means for moving the at least one receiver assembly in said cavity along an axis of said jack between a retracted position away from a wall of the borehole and a position in which the at least one assembly is coupled with said wall of the borehole, and resilient suspension means, interposed between the actuating jack and said at least one receiving assembly, for resiliently suspending said at least one receiver assembly; said at least one receiver assembly being suspended by said suspension means and permitted by deformation of the suspension means to oscillate along a direction substantially perpendicular to the axis of said jack; whereby vibrations from the probe to the at least one receiver assembly are damped at least along a direction substantially perpendicular to the axis of said jack.

2. A device according to claim 1, wherein said at least one receiver assembly is connected by said resilient suspension means to a rigid member fixed to a rod of a cylinder of said jack.

3. A device according to claim 2, wherein said resilient suspension means comprise at least one element made from composite material having a modulus of elasticity that is anisotropic, the oscillation axis of each receiver assembly being disposed parallel to a direction of maximum elasticity of said at least one suspension element.

4. A device according to claim 1, comprising a plurality of receiver assemblies each suspended from a suspension means and disposed so as to oscillate along respective directions orthogonal with respect to each other.

5. A sound wave reception device to be positioned in a probe lowered into a borehole at an end of a cable, said probe being provided with at least one anchoring movable arm, opening of said at least one arm pushing the probe towards a wall of the borehole, said device comprising a receiver assembly; an actuating jack associated with a hydraulic system for moving the receiver assembly along an axis of said jack between a retracted position and a position in which the assembly is coupled with a wall of the borehole, said jack comprising a body secured to the probe and a piston; a sleeve sliding on the body of said jack and connected with the piston thereof; and a resilient suspension element for resiliently connecting the receiver assembly to the sleeve, said suspension element comprising a tubular sheath having a inner diameter greater than an outer diameter of the sleeve, which sheath and sleeve define an annular chamber; whereby vibrations of the probe to the receiver assembly are dampened at least along a direction substantially perpendicular to the axis of said jack.

6. A device according to claim 5, further comprising means for causing said annular chamber to communicate with a part of the jack body between a first end thereof and said piston.

7. A device according to claim 5, wherein the hydraulic system is adapted for establishing separately in the annular chamber a pressure greater than static pressure reigning outside the probe, when the receiver assembly is coupled with the wall of the well.

8. A device according to claim 5, wherein the pressure means further comprise a pneumatic system for maintaining in said annular chamber a pressure greater than static pressure reigning outside the probe.

9. A sound wave reception device to be positioned in a probe lowered into a borehole at an end of a cable, said probe being provided with at least one anchoring movable arm, opening of said at least one arm pushing the probe towards a wall of the borehole, said device comprising a receiver assembly and an actuating jack associated with a hydraulic system for moving the receiver assembly along an axis of said jack between a retracted position and a position in which the receiver assembly is coupled with a wall of the borehole, said jack comprising a body and a piston, and the probe being provided with a cavity; and resilient suspension elements for resiliently suspending the jack body with respect to the probe in said cavity, the receiver assembly being secured to the piston of said jack and being arranged to oscillate substantially perpendicular to said piston; whereby vibrations of the probe to the receiver assembly are dampened at least along a direction substantially perpendicular to the axis of said jack.

10. A device according to claim 9, wherein said resilient suspension elements are a pair of elongated plates made from resilient material, end portions of the plates being disposed perpendicular to the axis of said body and central portions of the plates encompassing said body.

11. A device according to claim 10, wherein the receiver assembly is disposed so as to oscillate along a direction perpendicular to said resilient materials.

12. A device according to claim 9, wherein said resilient suspension elements are springs arranged vertically on opposite sides of the body.

13. A device according to claim 12, wherein the receiver assembly is disposed so as to oscillate along a direction parallel to a main direction of deformation of the springs.

14. A device according to claim 9, wherein said resilient suspension elements are made from composite materials whose modulus of elasticity is anisotropic, the oscillation axis of the receiver assembly being disposed parallel to the direction of maximum elasticity of said suspension elements.

15. A device according to claim 14, further comprising at least three receiver assemblies, axes of cylinders of the jacks of these three assemblies being orientated at 45° with respect to each other.

16. A sound wave reception device to be positioned in a probe lowered into a borehole at an end of a cable, said probe being provided with an anchoring movable arm, opening of said arm pushing the probe against a wall of the borehole, said device comprising a receiver assembly; an actuating jack associated with pressure means for moving the receiver assembly along an axis of said jack between a retracted position away from the borehole wall and a position in which the receiver assembly is coupled with a wall of the borehole; and a resilient suspension means that is elongated in the direction of the jack axis having an elasticity modulus that is anisotropic for resiliently suspending said receiver assembly at a distance from said jack and allowing the receiver assembly to oscillate in a plane substantially perpendicular to the axis of the jack, whereby vibrations from the probe to the receiver assembly are dampened at least along a direction substantially perpendicular to the axis of said jack.

17. A sound wave reception device to be positioned in a probe lowered into a borehole at an end of a cable, said probe being provided with at least one anchoring movable arm, opening of said at least one arm pushing the probe towards a wall of the borehole, said device comprising at least one directional receiver assembly displaceable in a cavity of the probe and an actuating jack associated with pressure means for moving the at least one receiver assembly in said cavity along an axis of said jack between a retracted position away from the wall of the borehole and a position in which the at least one receiver assembly is coupled with said borehole wall, and resilient means a directional elongated resilient means in a steady relationship with a wall of said cavity at a first end thereof and supporting said directional receiver assembly at a distance from the first end of said resilient means, deformation of said resilient means deformation of said resilient means causing said at least one receiver assembly to oscillate along a direction substantially perpendicular to the axis of said jack, whereby vibrations from the probe to the at least one receiver assembly are dampened at least along a direction substantially perpendicular to the axis of said jack.

18. A sound wave reception device positioned in a probe lowered into a borehole at an end of a cable, said probe having a cavity and being provided with at least one anchoring movable arm, opening of said at least one arm pushing the probe cavity towards a wall of the borehole, said device comprising:
at least one directional receiver assembly displaceable in said probe cavity;
an actuating jack associated with pressure means for moving said at least one receiver assembly in said cavity along an axis of said jack between the retracted position away from the wall of the borehole and a position in which the at least one receiver assembly is coupled with said borehole wall while the probe remains stationary along said borehole;
a directional elongated resilient means having a first end and a second end and an axis parallel to the jack axis, said first end being fixed relative to a wall of said cavity against movement in a plane that is perpendicular to the axis of the jack; and
said directional receiver assembly being supported at a distance from the first end of said directional elongated resilient means toward said second end which cause said at least one receiver assembly to oscillate along a direction substantially perpendicular to the axis of said jack are dampened at least along a direction substantially perpendicular to the axis of said jack.

* * * * *